United States Patent
Kizuya et al.

[11] Patent Number: 5,621,611
[45] Date of Patent: Apr. 15, 1997

[54] DISPLAY DEVICE AND METHOD FOR ASSEMBLING OR DISASSEMBLING THE SAME

[75] Inventors: Isao Kizuya, Hitachi; Keiji Kitazawa, Hitachioota, both of Japan

[73] Assignee: Hitachi, Ltd., Tokyo, Japan

[21] Appl. No.: 313,618

[22] Filed: Sep. 30, 1994

[30] Foreign Application Priority Data

Sep. 30, 1993 [JP] Japan .................................... 5-244226

[51] Int. Cl.⁶ .................................................... H05K 7/10
[52] U.S. Cl. .......................... 361/681; 29/464; 29/469; 361/682
[58] Field of Search .................... 361/680–683, 361/724–728; 312/223.1, 223.2, 223.5, 7.2; 348/826, 836, 839, 843, 794, 787; 29/469, 464

[56] References Cited

U.S. PATENT DOCUMENTS

| | | | |
|---|---|---|---|
| 3,573,366 | 4/1971 | Joseph | 178/7.8 |
| 4,388,671 | 6/1983 | Hall et al. | 361/682 |
| 4,646,159 | 2/1987 | Beaumont et al. | 358/254 |
| 4,819,115 | 4/1989 | Mitchell | 361/308 |
| 5,025,489 | 6/1991 | Yamaguchi | 361/818 |
| 5,192,893 | 3/1993 | Velasco et al. | 315/85 |
| 5,363,150 | 11/1994 | Kojima | 348/836 |

*Primary Examiner*—Leo P. Picard
*Assistant Examiner*—Lynn D. Feild
*Attorney, Agent, or Firm*—Kenyon & Kenyon

[57] ABSTRACT

A display device can be capable of suppressing electromagnetic interference and be easily disassembled into pieces of different materials such as plastics and metallic materials. A duct is formed in a part of a plastic frame and a shielding case having resilience is pressed from above into position on the duct. Furthermore, modules are attached on the frame, which is then mounted to the body of the device. Thus, the lower part of the shielding case contacts the metallic bottom chassis to thereby shield cables of a front module. Thus, the plastic material of the front module and the metallic material of the cable shielding case and others, being separable into different pieces, can easily be recovered for recycling purposes.

2 Claims, 4 Drawing Sheets

DISPLAY DEVICE AND METHOD FOR ASSEMBLING OR DISASSEMBLING THE SAME

BACKGROUND OF THE INVENTION

The present invention generally relates to a display device and methods for assembling and disassembling the display device. More particularly, the present invention relates to the suppression of electromagnetic radiation, simplification of the assembly process, and further optimum constitution for separation and recovery of the display device, which uses a cathode-ray tube (hereinafter called the CRT), and methods for assembling and disassembling the display device.

Generally, a power switch and a brightness control knob used in a prior art CRT display device are arranged, with facility of operation taken into consideration, on the front face below the CRT, while a module and so forth mounted with other electronic circuits are disposed at the rear. As shown in FIG. 7, therefore, a front module 1 is secured by screws to the front face below the CRT display device. The main module 2 is disposed at the rear, and interface cables 3 and 4 are electrically connected by connectors 5 and 6 with the main module 2, whereby a power circuit is formed. In the case of such a structure, therefore, the overall length of the interface cables 3 and 4 must be increased to some extent in order to facilitate connection with the main module 2. It, however, becomes necessary to clamp the extended cables 3 and 4 to prevent them from being pinched by the main module 2 or the front module 1. Further, it also becomes important to take a measure for suppressing electromagnetic wave radiation coming from these cables 3 and 4. A conceivable measure to be taken to suppress the electromagnetic wave radiation is to enclose the cables 3 and 4 with a braided wire or to hold the cables 3 and 4 in contact with a metallic bottom chassis 8.

On the other hand, a problem of global environmental disruption has occurred in recent years. One of the measures urged to solve this environmental problem is the recycling of industrial wastes. It is therefore an important prerequisite to facilitate the disassembly of discarded equipment into various recyclable materials.

Display devices of related arts have been disclosed in Japanese Patent Laid-Open Nos. Sho 58-99078 and Sho 63-135076.

According to a method for enclosing the cables 3 and 4 with braided wire or for holding the cables 3 and 4 in contact with the metallic bottom chassis 8, a substantial electromagnetic shielding effect is obtainable to accomplish the suppression of electromagnetic wave radiation. In the meantime, however, no countermeasure against the environmental disruption has been taken into consideration (for example, the recycling of industrial wastes).

That is, in the case of the disclosed prior art display devices, when the front module is taken out, the main module is first drawn out to the rear of the CRT display device, and then the cables must be disconnected from the connectors. Subsequently, screws fixedly attaching the front module are removed to remove the front module. The above procedure, however, is inefficient. Furthermore, in the case in which the cables are covered with metal such as a braided wire, an increased amount of work is required for separating the cable into plastics and metallic parts as waste materials, and moreover the recycling of the waste material is unfeasible, which, from the viewpoint of economy, will not present a practical solution to the above problem.

SUMMARY OF THE INVENTION

The present invention provides a CRT display device having a structure that allows efficient recycling. The present invention additionally provides a CRT device having a structure that is capable of suppressing the electromagnetic wave radiation.

To accomplish the above object, the display device of the present invention includes features such that both the front module having a front panel control input means on the display face side of the display device and the main module forming a power circuit are constituted as a unit on one frame. Another feature of the present invention is the adoption of a shield construction fitted in one part of the frame.

At least the front and main modules, being replaceable as one unit, can easily be assembled and disassembled. The adoption of the shielding construction which is easy to assemble and disassemble enables the suppression of electromagnetic radiation.

BRIEF DESCRIPTION OF THE DRAWINGS

All of the foregoing and still further objects and advantages of the present invention will become apparent from a study of the following specification, taken in connection with the accompanying drawings, wherein.

DETAILED DESCRIPTION

Hereinafter the preferred embodiment of a display device according to the present invention will be described with reference to the accompanying drawings.

According to the present embodiment, the front module is not fixedly mounted at the front face below a CRT display device, but is inserted into, and removed from, the rear of the device, together with the main module as a unit. An explanation, therefore, will be given on the construction and assembly method of the display device that the main module and the front module are both secured on the frame produced of the same plastic or other material, and the shortest possible interface cables are connected therebetween on the frame produced of the same plastic or other material, so that both the front module and the main module may be together inserted into, and removed from, the rear of the CRT display device.

Next explained are the construction and assembly method of a shielding case. For shielding the interface cables of the front and main modules, there is first provided a duct on the plastic frame in which the cables are inserted through, and the shield is made of a metal in a form of casing which encloses the upper, right and left sides of the duct; and the shielding case can be quickly mounted from above to the duct. For a downward enclosure, the whole body of the modules is placed on the metallic bottom chassis to thereby hold the lower part of the shielding case in contact with the metallic bottom chassis, thus enabling shielding of the cables.

That is, the plastic frame mounted with the front module, the main module and the shielding case is mounted on the metallic bottom chassis, thereby enabling the suppression of electromagnetic waves generated from the cables of the front module.

Further, using the plastic frame mounting structure for mounting the front module and the main module as one unit enables, for a recycling purpose, easy removal of the front module, the shielding case, the main module and other modules from the plastics frame. It is, therefore, possible to separate inner parts of the modules into metallic and plastics parts within a short period of time in order to enable recycling.

Figure 1:
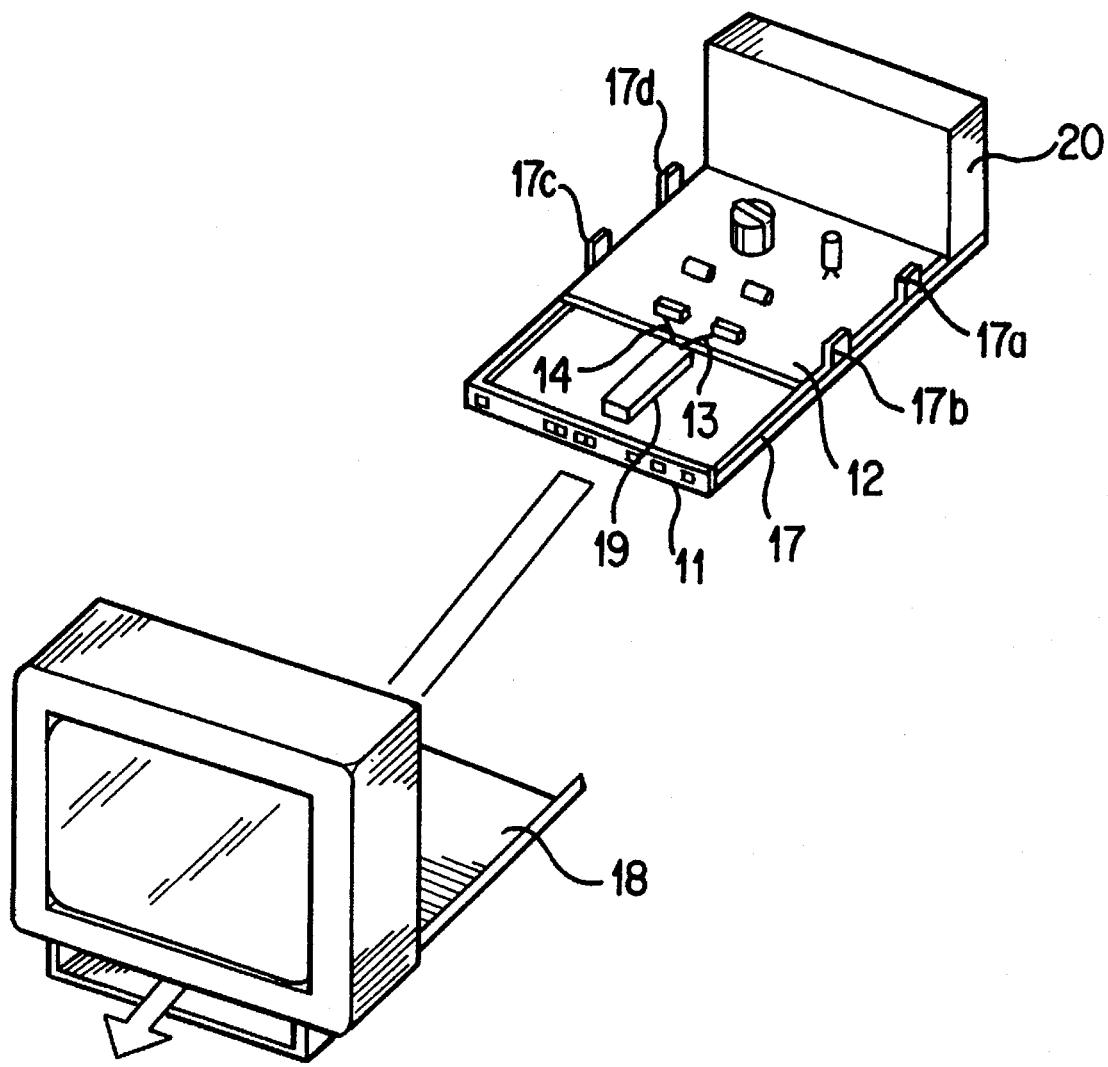
FIG. 1 is a general perspective view of an embodiment of the display device of the present invention showing each module after installation to a frame and before installation to the body of a CRT display device.

Hereinafter the display device will be explained by referring to the accompanying drawings. First, FIG. 1 shows the display device after installation, to a frame 17, of a front module 11 having the operating functions and related circuits of a power switch, a brightness control, etc. which are operation input members for adjusting the function of the display device, a main module 12 including high-voltage circuits such as the power circuit, etc., and a video module 20 including a high-frequency circuit such as a video circuit, etc., and before insertion of the frame 17 thus mounted with the modules all together into the body of the CRT display device (in the example shown in FIG. 1, a main chassis including a metallic bottom chassis 18). The direction of insertion is indicated by an arrow.

Figure 2:
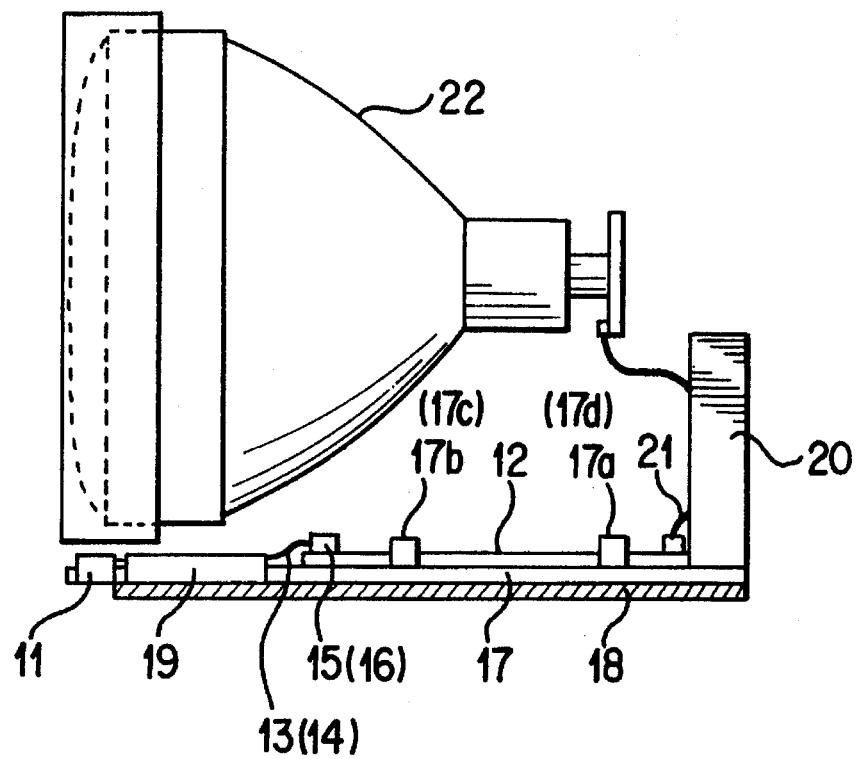
FIG. 2 is a side view showing, in the embodiment of the present invention, details of each display mounted to the body of the CRT display device.
Figure 4:
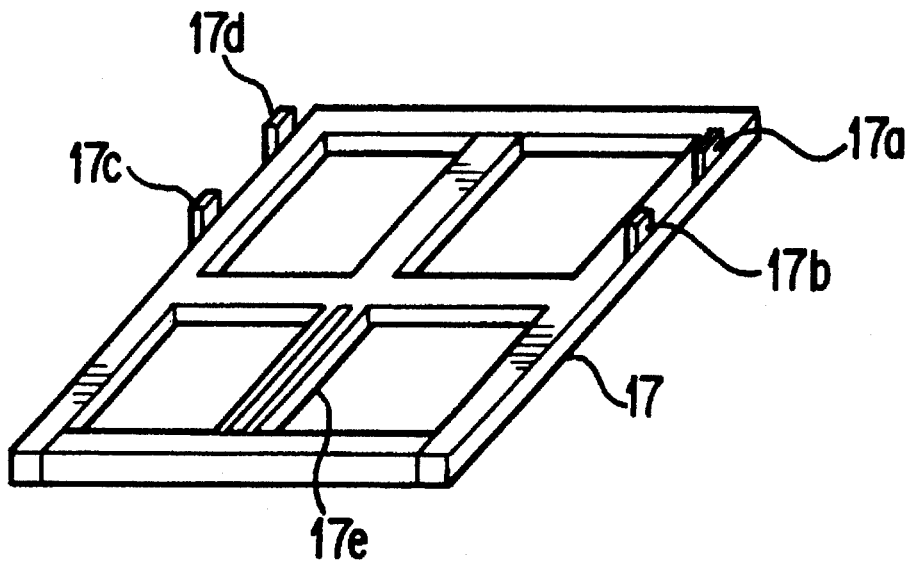
FIG. 4 is a perspective view showing, in the embodiment of the present invention, a detailed shape of the frame for installation of the modules.

FIG. 2 is a side view showing the body of the CRT display device (in the example of FIG. 1, the metallic bottom chassis 18) with the frame 17 inserted and then with a cathode-ray tube 22 installed. In FIG. 2, the frame 17 has the shape as shown in FIG. 4 and is produced of a plastic material. Clips 17a to 17d provided on the frame 17 are projections for fitting the main module 12 from above into the frame 17. These clips are molded integral with the frame 17. The front module 11 and the video module 20 also are mounted by similarly fitting in the frame 17. Electromagnetic waves generated from the video module 20 which comprises a video circuit, etc. including a high-frequency circuit pass through a cable 21 routed between the video module 20 and the main module 12, further propagating to the cables 13 and 14 between the front module 11 and the main module 12 via a print pattern of the main module 12. Therefore, as shown in FIG. 2, the electromagnetic waves radiated outside from the cables 13 and 14 can be prevented from leaking outwardly from the cables 13 and 14 by shielding with the shielding case 19.

Figure 3:
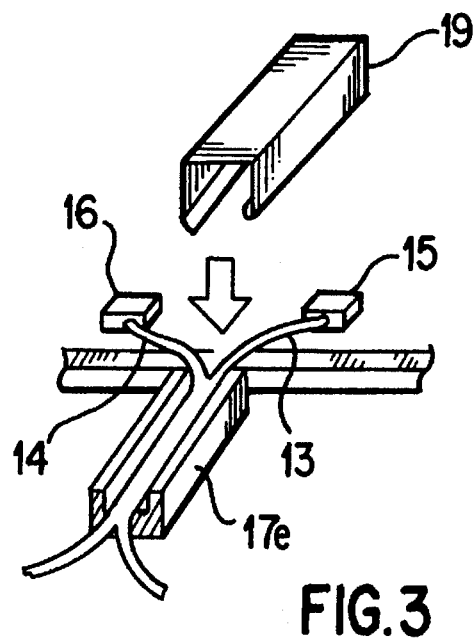
FIG. 3 is an enlarged perspective view showing, in the embodiment of the present invention, details of mounting of a shield case to a duct section of the frame for the installation of the modules.

Next, as shown in FIG. 3, there is provided a duct 17e for installing the cables in the middle of the forward part of the frame 17. The shielding case 19 is mounted over the duct 17e at least to cover a groove section in which the cables 13 and 14 are embedded. The dimensions of the shielding case 19, therefore, are determined according to the external size of the duct 17e. Furthermore the shielding case is produced of a sheet metal and is provided with resilience in a lateral direction in order that the shielding case 19 may be pressed from above onto the duct 17e for the purpose of reducing the time required for installation and removal of the shielding case 19 relative to the duct 17e. That is, the shielding case 19 with this resilience is fitted on the duct 17e.

Furthermore, as shown in FIG. 2, after the mounting of the shielding case 19 on the duct 17e of the frame 17 and the installation of the whole body of the modules in the CRT display device, the lower part (the folded portion of the side of the case) of the shielding case 19 contacts the metallic bottom chassis 18; that is, in this state, the cables 15 and 16 are fully covered with a metal, consequently enabling to suppress the electromagnetic waves generated from the cables 15 and 16.

In the case of disassembling the CRT display device, the cathode-ray tube 22 and the frame 17 are removed from the body of the display device, and then the shielding case 19 can easily be removed by pulling upwardly from the duct 17e of the frame 17 while laterally spreading. In the meantime, the front, main and video modules can also easily be separated and recovered into each module by disconnecting the cables from the modules and detaching each module from the frame 17.

Figure 5:
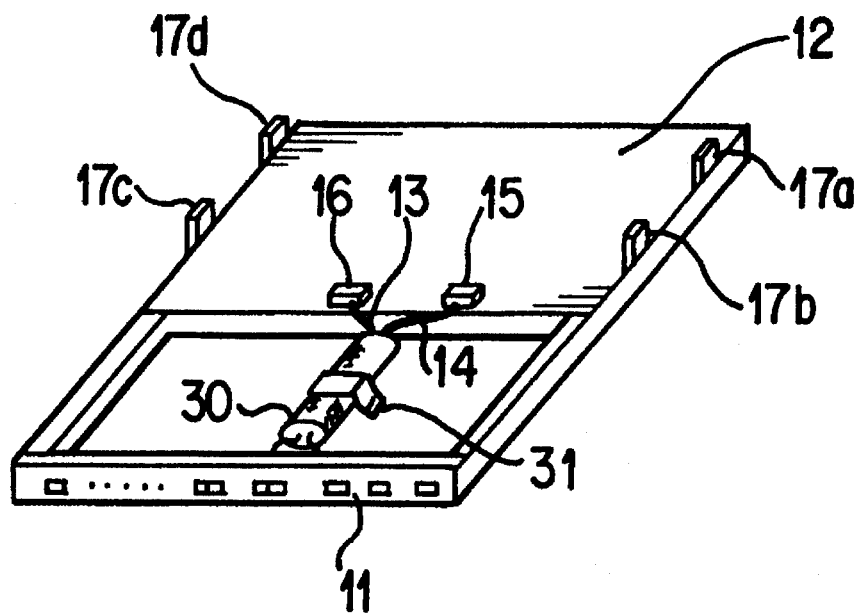
FIG. 5 is a perspective view showing an example of variation of the embodiment of the present invention in which a braided wire is used for shielding cables.
Figure 6:
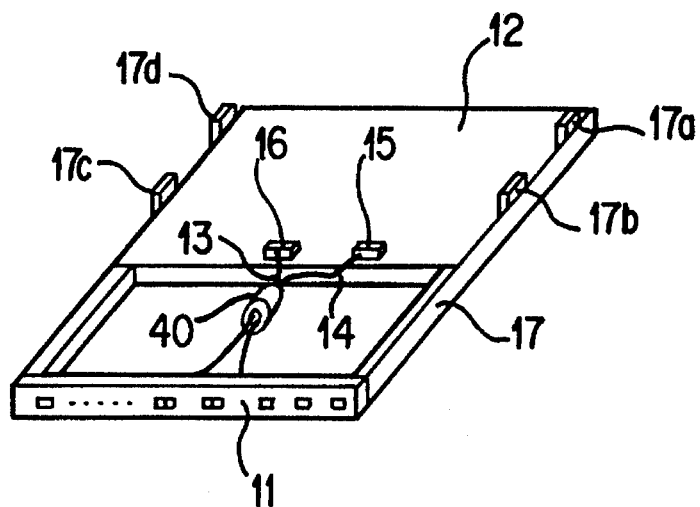
FIG. 6 is a perspective view showing the example of variation of the embodiment of the present invention in which a ferrite core is used for shielding the cables.
Figure 7:
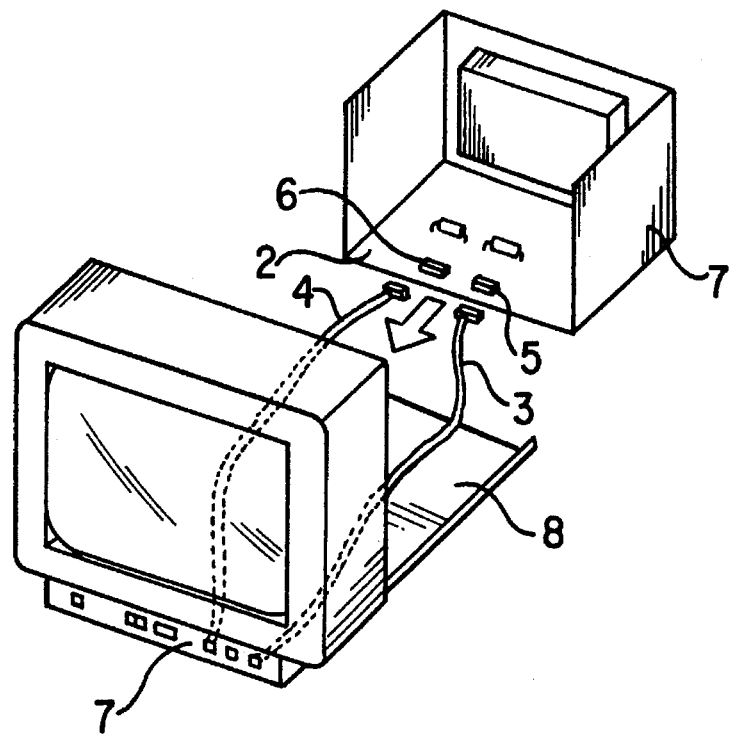
FIG. 7 is a perspective view showing one example of prior mounting structure.

Variations of the present invention are shown in FIGS. 5 and 6.

FIG. 5 gives an example of installing a braided wire 30 in place of the shielding case 19 to the cables 13 and 14 and installing a spring 31 from above to the duct 17e for the purpose of suppressing the electromagnetic waves radiated from the cables 13 and 14.

FIG. 6 gives an example of suppressing the electromagnetic waves radiated from the cables 13 and 14 by using a ferrite core 40 for shielding purpose. The cables 13 and 14 are inserted into the ferrite core 40 to thereby change the electromagnetic waves produced from the cables 13 and 14 into a heat loss of the ferrite core, thus suppressing the electromagnetic waves.

As is clear from the above explanation, according to the CRT display device of the described structure, the front and other modules can easily be inserted into, and removed from, the CRT display device and besides the cable shielding material also can easily be installed to, and removed from, the cables. The display device, therefore, has excellent assembling and maintenance effects.

Furthermore, since plastics and metallic products can easily be broken up into separate pieces, materials of these products are easily and separately recoverable. These materials, therefore, become reusable as recycles by separately reprocessing.

It should be understood that an example of the display device using a CRT has been explained, and the present invention may be applied to other types of display devices.

According to the present invention, a construction of an excellent recycling effect can be provided and further the electromagnetic waves generated from the interior of the display device can be suppressed.

It should be further understood by those skilled in the art that the foregoing description is a preferred embodiment of the disclosed display device and that many modifications and variations may be made in the invention without departing from the spirit and scope thereof.

What is claimed is:

1. A display device, comprising:

a frame;

a chassis;

a front module having a front panel control input means of said display device;

a main module forming a power circuit;

a part of wiring installed for connection between said front module and said main module; and a shield which is fitted on said frame to cover said part of wiring;

wherein said front module and said main module are integrally assembled on said frame;

wherein said frame is slidingly insertable on said chassis; and wherein said frame includes a duct on which the shield is fitted, and wherein the shield contacts the chassis.

2. A method for assembling a display device including a frame, a front module having a front panel control input means, a main module forming a power circuit, and a main chassis having a space provided therein and including a bottom chassis, the method comprising steps of:

mounting on said frame said front module and said main module; and slidingly inserting said frame into said space provided in the main chassis;

said display device further including a shield material and a part of wiring installed between said front module and said main module, said method further comprising a step of fitting to said frame said shield material to cover said part of wiring, said fitting step following said mounting step and prior to said inserting step;

wherein said frame includes a duct formed thereon, wherein said fitting step includes fitting said shield material on said duct of said frame such that said shield material contacts said chassis.

* * * * *